W. H. PRATT.
METER.
APPLICATION FILED MAY 4, 1904.

917,130.

Patented Apr. 6, 1909.
5 SHEETS—SHEET 1.

Witnesses:

Inventor,
William H. Pratt,
By ........
Att'y.

W. H. PRATT.
METER.
APPLICATION FILED MAY 4, 1904.

917,130.

Patented Apr. 6, 1909.
5 SHEETS—SHEET 2.

Witnesses:

Inventor,
William H. Pratt
By Albert G. Davis
Att'y.

W. H. PRATT.
METER.
APPLICATION FILED MAY 4, 1904.
917,130.
Patented Apr. 6, 1909.
5 SHEETS—SHEET 3.
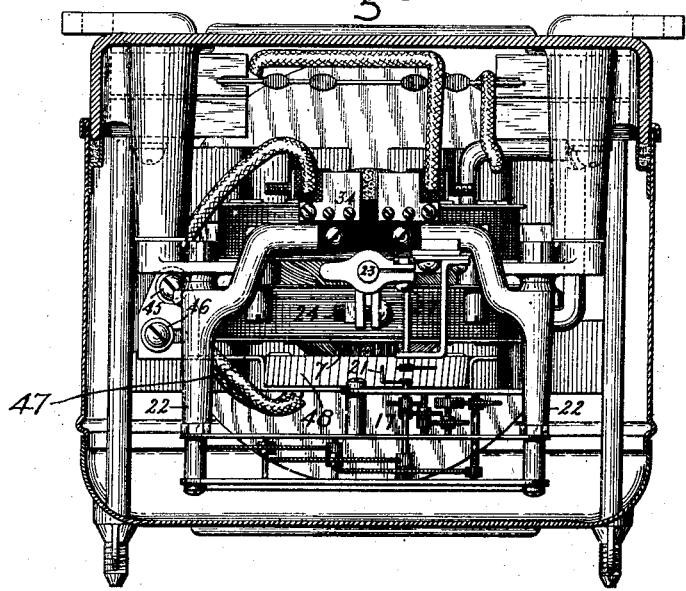
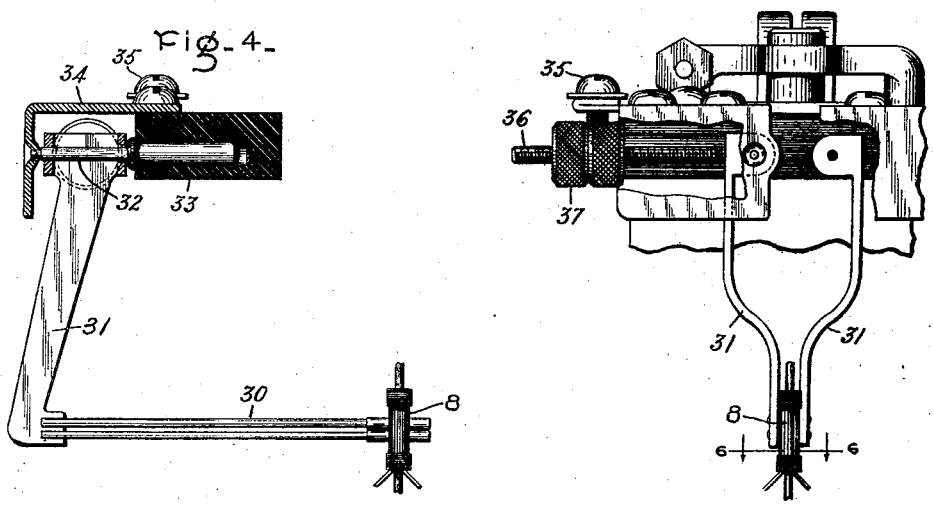
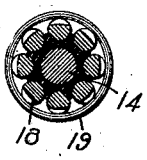
Witnesses:
Inventor,
William H. Pratt,
By
att'y.

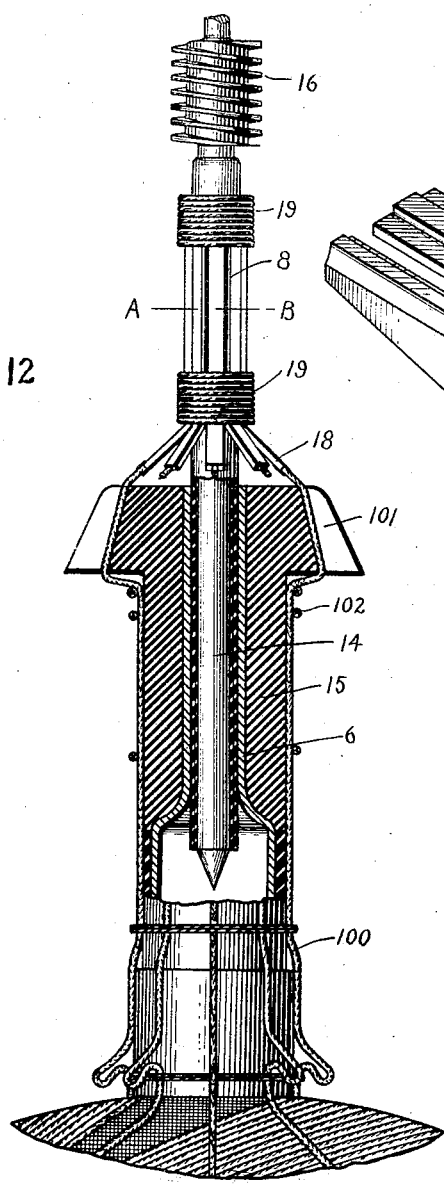
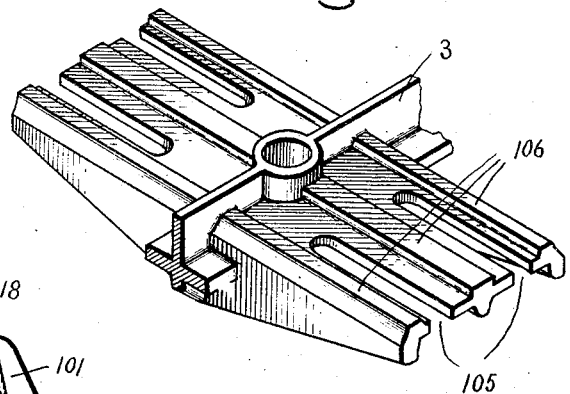
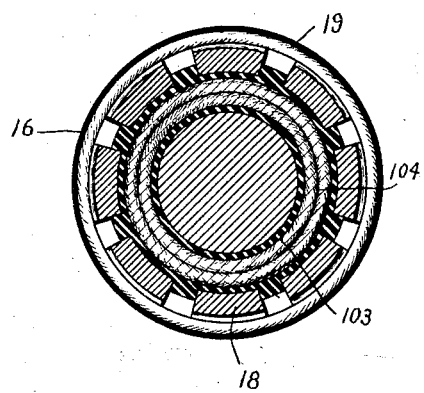

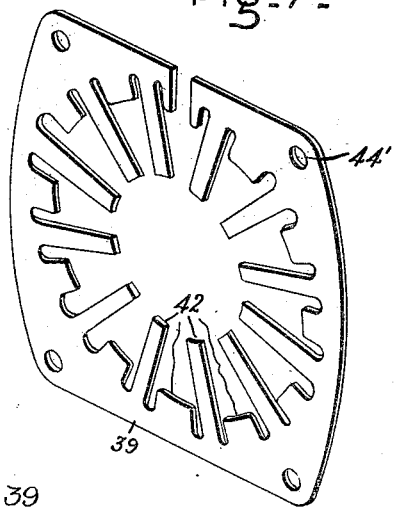
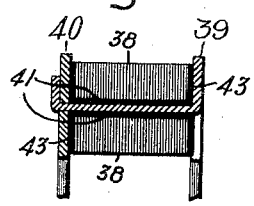
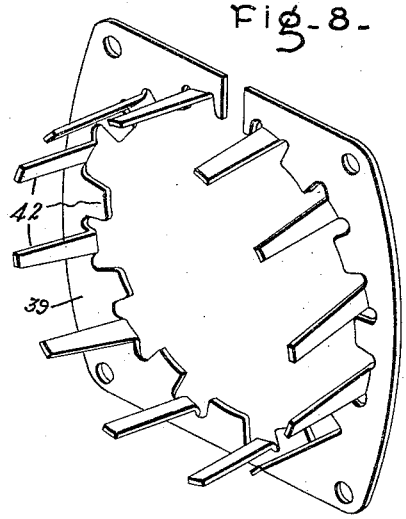
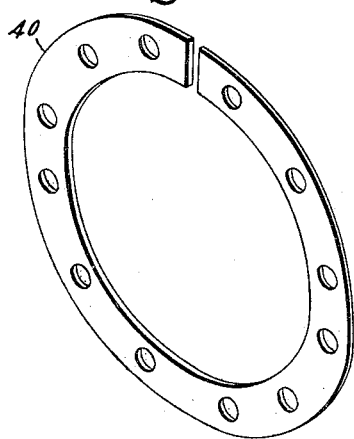

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

METER.

No. 917,130.   Specification of Letters Patent.   Patented April 6, 1909.

Application filed May 4, 1904. Serial No. 206,279.

*To all whom it may concern:*

Be it known that I, WILLIAM H. PRATT, a citizen of the United States, residing at Lynn, county of Essex, State of Massachusetts, have invented certain new and useful Improvements in Meters, of which the following is a specification.

This invention relates to an instrument for measuring the energy or a factor of the energy consumed in an electric circuit or branch circuit.

More particularly, the invention relates to an integrating wattmeter of the type employing an electric motor driving the wheel train of a dial register and having its rotation retarded by permanent magnets acting on a metallic disk secured to the shaft of the motor.

The objects of my invention are to make the meter more accurate for loads varying between wide limits by increasing both the torque of the motor and the damping effect of the permanent magnets and at the same time to decrease the weight of the moving element of the meter and thereby decrease friction in the bearings.

Other objects of the invention are to so construct the commutator of the meter-motor that the friction between it and the brushes is reduced to a minimum and to so arrange the brush-holders that the contact between the brushes and commutator can be delicately adjusted and when once adjusted will remain the same throughout a long period of use whereby the friction between the brushes and commutator is rendered constant throughout the life of the meter; also, to provide adequate means for protecting the moving element of the meter against injury during transportation, and in other ways to effect improvements in the construction of meters of this type.

The novel features of my invention will be definitely indicated in the claims appended hereto.

The details of construction and the mode of operation of the meter will be better understood by reference to the following description taken in connection with the accompanying drawings which illustrate the preferred embodiment of my invention.

Figure 1:
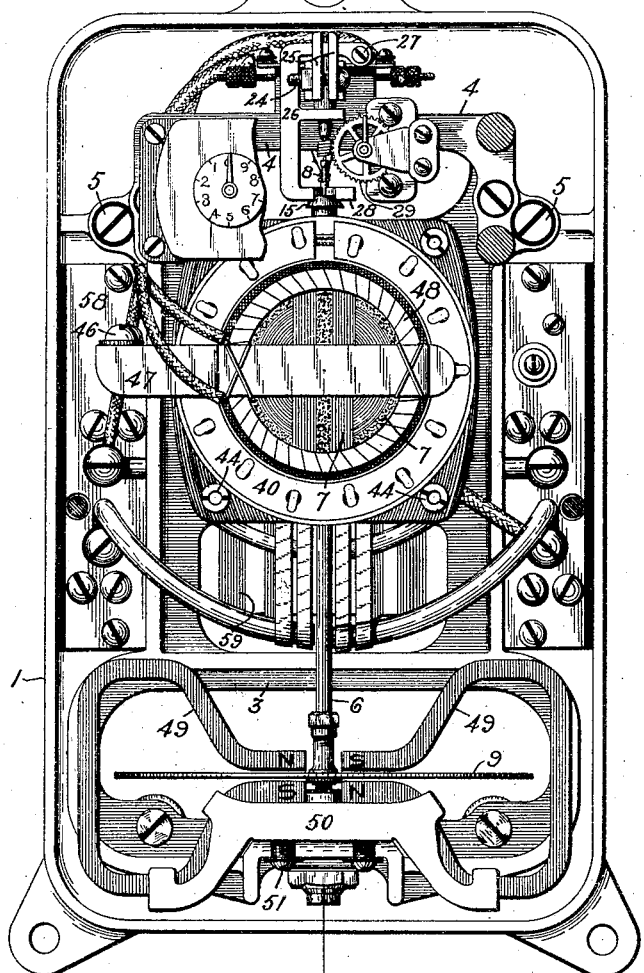
Figure 11:
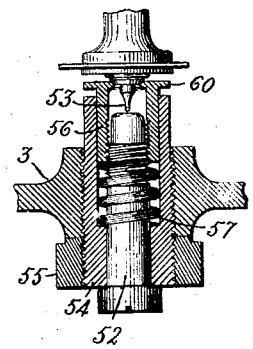
Figure 2:
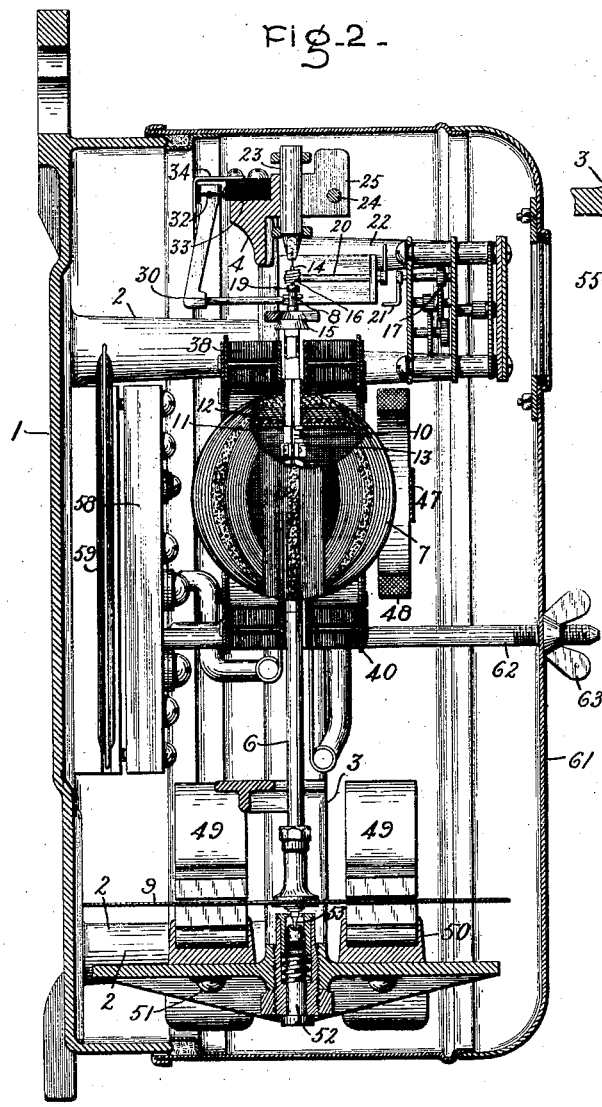

In the drawings, Figure 1 is a front view of the meter with the casing removed; Fig. 2 is a section on the line 2—2 of Fig. 1; Fig. 3 is a top view with the casing in section; Fig. 4 is a detail view of one of the brush-holders; Fig. 5 is a back view of the brush-holders broken away in part; Fig. 6 is an enlarged section through the commutator on line 6—6 of Fig. 5; Fig. 7 is a perspective view of the supporting plate of one of the field coils; Fig. 8 is a similar view of the same having the radial fingers bent at right angles to the plate; Fig. 9 is a perspective view of the retaining plate or collar for one of the field coils; Fig. 10 is a section through one of the field coils and its supporting plates; Fig. 11 is a section through the lower bearing; Fig. 12 is an enlarged view partly in section showing the upper portion of the rotating element, including a portion of the shaft, the commutator, and the method of connecting the armature leads to the commutator. Fig. 13 shows a lower portion of the frame 3 which supports the damping magnets; and Fig. 6^A shows a cross-section on the line A B of Fig. 12 of the commutator and shaft showing a different shape of commutator bar from that shown in Fig. 6.

In the drawings, 1 indicates a casting forming the back of the meter and having outwardly extending lugs or projections 2 to which is secured the frame 3 of the meter. Mounted in the lower part of the frame 3 and in the upper part of an auxiliary upper frame 4 secured to the main frame 3 by suitable screws 5 but insulated therefrom, as shown, are bearings for the vertical shaft 6 of the meter which carries the armature 7 and commutator 8 of the motor and the drag disk 9. The armature 7 has the form of a hollow sphere and consists merely of the armature coils and the devices for securing them to the shaft 6 of the meter. The spherical form of the armature is preferred for the reason that with circular coils the weight of the armature, which forms a large part of the weight on the step bearing of the meter, is considerably reduced, since the minimum weight of wire per ampere-turn inclosing a given area is required when circular coils are used and also for the reason that with a spherical armature and circular field coils the clearance between these two parts can be reduced to a minimum thus making the maximum number of the lines of force of the field coils effective in producing torque. Another distinctive feature of this armature is that it has no interior supporting body other than the shaft and two small washers thereon which position the armature and help to support the coils and hence it is much lighter than armatures used for this purpose heretofore in which there is a spool or frame on which the coils are wound. It is preferably constructed by winding the coils of the armature upon a ball of fusible material, such for instance as paraffin, and then melting out this material, and this method of winding armatures forms the subject-matter of a separate application for Letters Patent filed May 24, 1904 and serially numbered 209,574. The armature structure consists of a split tube 10 having a shoulder near each end on which rests a small, stiff support or washer 11 of thin, non-magnetic material. This washer and the ends of the split tube 10 are covered with insulating material, such for instance as shellacked paper, as shown at 12. Each coil of armature conductors consists of a plurality of turns of wire wound over the two insulated washers 11 from one to the other, the several coils together forming a sphere having an air core, as shown in Fig. 2, broken away in part. The split tube 10 is provided with suitable clamps 13 by which the armature is secured to shaft 6. The ends of each coil 100 (Fig. 12) extend up along shaft 6, but are insulated therefrom, and through individual openings 101 in a guard 15 of fiber or other insulating material mounted on shaft 6 for a purpose hereinafter to be described. Shaft 6 is preferably made from a hollow tube for the sake of lightness, as is shown in Fig. 12 and Fig. 2. Its upper end is reduced in diameter and into this is driven a steel rod 14 of small diameter insulated outside by a layer of enamel 103 (Fig. 6A) and two layers of silk 104 and japanned, or any other suitable insulation. This rod forms an extension to said shaft and carries the commutator 8 and the worm 16 which drives the dial train 17. Driven on the small end of shaft 6 is an insulating sleeve 15 with the upper end enlarged for a purpose to be hereinafter described, through which are holes or slots 101 to allow the ends of the armature coils 100 to pass up to the commutator. These are bound to sleeve 15 by windings of silk or thread 102 and fastened to the commutator bars 18. The segments of the commutator 18 consists of strips of wire placed in position around the rod 14, bound to the latter at each end with silk thread 19. The silk thread 19 and the commutator segments may be then coated with an insulating compound, after which the whole is baked until the compound is hard. A portion of the japan between the segments may then be scraped out so as to leave air spaces between the several segments to allow for wear. The surface of the cylinder thus formed is then surfaced up until each of the segments of the commutator present a smooth surface, as shown in Figs. 6 and 6A. The ends of the armature coils are then connected to the segments of the commutator in any suitable manner. By this construction the diameter of the commutator can be greatly reduced and a reduction corresponding thereto is thus effected in the friction between the commutator and the brushes.

Above the commutator 8 on rod 14 is the worm 16 in mesh with the worm-wheel 29 mounted on shaft 20 which is journaled in bearings in a frame secured to the upper frame 4. On the end of shaft 20 is a finger which when the shaft is rotated engages a crank 21 on the drive shaft of the dial train 17 which is carried by projections 22 integral with the upper frame 4. This forms a flexible coupling between the meter shaft and the dial train, making it unnecessary to position the dial train with such precision as is necessary when the worm-wheel is mounted on an extension of the drive shaft of the dial train. The upper end of rod 14 fits in a bore in the upper bearing plug 23 which is clamped in proper position by the clamping bolt 24 between jaws 25 formed integral with the upper frame 4. The end of the bearing plug 23 extends above the jaws 25, and adjustably mounted thereon is an E-shaped piece 26, each of the lateral arms of which has an opening therein, all in axial alinement. The bearing plug 23 extends through the openings in the two upper arms of the E-shaped piece and the latter is clamped to the plug by a clamping screw 27, as is shown in Fig. 3. The shaft of the meter extends through the opening in the lowest arm 28 of the E-shaped piece 26, and the method of mounting the latter insures coincidence of the center line of the opening in arm 28 and the axis of the shaft 6. The interior of the opening in arm 28 is beveled off as shown to correspond with the beveled edge of the guard 15. Normally, the E-shaped piece is so mounted as to leave sufficient space between the sides of the opening in arm 28 and the guard 15, to prevent dust from collecting between the parts and retard the rotation of the shaft. The piece 26 may, however, be lowered on plug 23 to bring the sides of the opening in arm 28 and the guard 15 close together, so that the moving element of the meter may be raised slightly to bring these two surfaces into contact and thus clamp the moving element to prevent injury to any of the parts of the meter during shipment, as will be further explained hereinafter.

The brushes 30 for conducting current to and from the commutator 8 are carried by arms 31 each of which is pivotally mounted on a short shaft 32 supported at one end by a block of insulation 33 rigidly mounted on the back of the upper frame 4 and at the other end by a sheet metal piece 34 secured on the top of the block of insulation 33. On each piece 34 is a binding screw 35 for making electrical connection to the brushes. Secured to each arm 31 and extending out therefrom is a threaded rod 36 on which are two knurled weights 37 by which the contact between the brushes and the commutator can be adjusted. This construction permits a much more delicate adjustment of the contact between the brushes and commutator than could be secured by the use of springs, and furthermore possesses the advantage that when once adjusted the contact will not change throughout the life of the meter, as the two weights can be readily locked together in the proper position when that position is once determined.

The field coils 38 of the meter-motor are preferably formed from strap or ribbon conductor wound on edge, as it is well known that a given number of turns of conductor having a given current-carrying capacity will occupy less space when ribbon conductor is used than with other forms of conductor. Also the coils of ribbon conductor wound on edge may be so constructed that each turn bears the same relation to the surrounding air as any other, and hence all radiate heat equally, whereas with round wire one or more turns are usually inclosed by the other turns and will be brought to a much higher heat than the others. For use in the field coils of meter-motors, ribbon conductor is particularly advantageous since a coil of ribbon conductor is far more rigid than coils made from ordinary round wire and for this reason the coil can be made without an interior support. This permits mounting the coil with its inner edge much closer to the armature of the meter-motor than has been possible heretofore with field coils bound to a considerable thickness with insulating fabric to hold the turns together or wound on a spool, thus effecting a material reduction in the magnetic leakage. In the preferred construction, ribbon conductor is used which is coated on both sides with a film of insulation, though other methods of insulating the several convolutions of the coil one from another may be pursued if desired, and each field coil is wound in two sections, one within the other and concentric therewith. The shape of the coils conforms to the shape of the armature; in the meter illustrated, the field coils are circular and the interior diameter of the inner section is but little greater than the diameter of the armature thus allowing only a small air space between the armature and field coils so that practically all of the lines of force cut the armature conductors. The two sections of a field coil are assembled one within the other and are held between supporting plates 39 and 40 of non-magnetic material, the coil sections being insulated from the plates and from each other by sheet fiber 41 or other suitable insulating material. The supporting plate 39 is a punching of non-magnetic sheet metal having a plurality of inwardly-projecting radial fingers 42, as shown in Fig. 7, the fingers 42 being long and short alternately and the plate being split at one point to prevent the flow of eddy currents therein. The long fingers 42 are bent at right angles to the plate, as shown in Fig. 8, and inserted between the two coil sections and between the sheets of insulation which separates the coil sections, fiber washers 43 being provided between the sides of each coil section and plate 39. The annular collar 40 forming the other supporting plate is also a punching of non-magnetic sheet-metal and has holes therein corresponding in number and position to the long fingers on plate 39 and a gap to prevent the circulation of eddy currents, as shown in Fig. 9; this collar is brought up against the insulating washers 43 on the other side of the coil with the fingers 42 on plate 39 extending through the holes. The ends of the fingers are then bent over to hold the coil firmly between the two plates, the whole forming a strong rigid structure as shown in section in Fig. 10. The supporting plate 39 extends out beyond the periphery of the outer coil section at suitable points and is provided with openings 44′ for the screws 44 by which the two field coils are secured directly to the frame 3 of the meter, one on either side thereof. The two sections of each coil may be permanently connected together in series or in parallel, or leads may be brought out from each section of each coil, so that any combination of the several coil sections in series or parallel can be made to obtain the current-carrying capacity and the number of turns desired. By this construction the interior diameter of the field coils can be made to approximate the diameter of the armature so closely that practically all of the lines of force must cut the armature coils; also the two field coils can be mounted so close together that practically all of the lines of force thread the two coils and thus cut the armature conductors in such manner as to exert the greatest turning effort. In this way a great increase in the torque of the motor is obtained.

Pivotally mounted at 45 (Fig. 3) on a lug on frame 3 and arranged to be secured in any position by the clamp screw 46 extending through a slot therein is an adjustable arm 47 carrying an auxiliary field coil 48 adapted to be connected in series with the armature of the meter-motor to compensate for friction, as is well understood in the art.

To properly retard the rotation of the meter, I provide the metallic disk 9 on shaft 6 and four permanent magnets 49 arranged in pairs, as shown in Figs. 1 and 2, each magnet having its poles reversed relatively to the other magnet of that pair, so that two astatic fields are formed, which the brake-disk 9 intersects. A brass clamp 50 rigidly supports the two magnets of each astatic couple and holds them apart a distance sufficient to make the reluctance of the path through the disk between the poles of a magnet very much less than that of the path across from a pole of one magnet to the opposite pole of the other magnet of that pair. I find by experiment that this arrangement of the magnets greatly increases their damping effect. The eddy currents generated by the two magnets of each pair flow in opposite directions in disk 9, the poles of the two magnets being oppositely arranged, and the return path followed by the eddy currents generated by one magnet is under the poles of the other magnet of that pair; that is, practically all of the eddy currents generated in the disk by cutting the lines of force of one of the astatic fields flow in a single path under the two pairs of poles instead of in two distinct paths as they would if the magnets had like poles on the same side of the disk; thus the two magnets act in series and the resistance of the path followed by the eddy currents is reduced to a minimum since its width is not restricted and its length is little more than the length of the magnet poles. The eddy currents generated are therefore greater and the drag of the magnets correspondingly increased. In order to adjust this drag I provide slots 105 (Fig. 13) in the frame 3 of the meter extending backward and forward from points near the lower bearing, and the clamping screws 51 extend through these slots and into the clamps 50. The surfaces of the frame upon which the magnets rest, 106, are planed smooth to allow for a free movement of the damping magnets during the adjustment. By this construction, the two magnets of each pair are always held in the same position relatively each to the other but may be adjusted together toward or away from the center of disk 9 to decrease or increase their damping effect.

The lower bearing consists of a jewel post 52 having a spring-supported jewel in its upper end, as is well known in the art, on which the pivot 53 secured in the lower end of shaft 6 rests. The jewel post 52 fits within a sleeve 54 which screws into a threaded bore in the lower part of the meter frame 3 and is locked in any adjusted position by a jam nut 55. Fitting in the upper end of the sleeve 54 is an interiorly-threaded, cylindrical plug 56 pressed upward by a stiff spring 57 coiled around the post 52 within sleeve 54, but normally held in the lowest position, with the flange 60 on its end bearing on the upper end of sleeve 54, by the jewel post 52, the end of which is threaded and screws into the plug. When the meter is to be shipped, the E-shaped piece 26 is lowered as above described and the jewel post 52 is unscrewed until it releases the plug 56 which latter is pressed upward by spring 57, it being guided in its upward movement by sleeve 54. In moving upward, plug 56 engages the lower end of shaft 6 and raises the entire moving element of the meter until the guard 15 comes in contact with the sides of the opening in the lower arm 28 of piece 26. This upward movement of the shaft however is not great enough to bring the damping disk 9 into engagement with the poles of the magnets 49 so that all danger of injury to the disk by coming in contact with the poles of the magnets is eliminated. If desired the E-shaped piece 26 may be left permanently in the position to which it is lowered but I prefer to raise it slightly and lock it in the raised position after the meter is mounted and ready for service. In this way the moving element is securely clamped and injury thereto during transportation is prevented.

Secured to the back 1 of the meter are connection boards 58 58 to which the circuit wires are brought and from which connection is made to the various parts of the meter. Back of these connection boards is a resistance 59 which is connected in series with the armature 7 of the meter-motor and the friction compensating coil 48 across the lines. The field coils 38 are connected in series in one of the lines or in a suitable shunt, as is well understood by those skilled in the art, and these coils may be arranged in series or in parallel as desired. In case the meter is used on a three-wire system each coil may be connected in series in one side of the system. A suitable casing 61 of sheet-metal incloses the parts of the meter and is held thereon by the bolts 62 and winged nuts 63.

I have described my invention as applied to an integrating wattmeter, but I do not wish to be understood as limited to any particular form of meter, as some features of the invention are applicable to electrical measuring instruments of all kinds; nor do I wish to be limited to the precise construction which I have shown herein, as many modifications can be made therein and all such modifications I aim to cover in the claims appended hereto.

What I claim as new, and desire to secure by Letters Patent of the United States, is,—

1. In a meter, a spherical armature having an air core, and a pair of circular field coils each consisting of a plurality of concentric coil sections, said field coils closely encircling the armature and mounted close together to reduce the number of stray lines of force, substantially as described.

2. In a meter, a spherical armature, and circular field coils consisting of ribbon conductor wound on edge closely encircling said armature.

3. In a meter, a spherical armature, and a circular field coil consisting of a plurality of concentric coil sections of ribbon conductor wound on edge closely encircling said armature.

4. In an electric meter, a frame, an armature, a plate secured to the frame and provided with a plurality of integral projections, and a field coil of ribbon conductor wound on edge held to the plate by said projections.

5. In an electric apparatus, a frame, an armature, a plate of non-magnetic material secured to the frame and provided with a plurality of integral projections, and a field coil composed of ribbon conductor wound on edge held to the plate by said projections.

6. In a meter-motor, a field coil of ribbon conductor wound on edge held between plates each of which has a gap therein to prevent the circulation of eddy currents.

7. In a meter, an armature, a field coil, and a pair of supporting plates therefor, one of said plates having integral projections thereon which engage the other plate to hold the coil firmly between them.

8. In a meter-motor, a field coil comprising concentric coil sections, and a supporting plate on either side thereof, one of said plates having integral projections extending between adjacent coil sections and engaging the other plate.

9. In an electric measuring instrument, a coil of ribbon conductor wound on edge, and a plate on either side of said coil insulated therefrom, one of said plates having projections integral therewith which engage the other plate.

10. In a meter-motor, an armature, a field coil composed of concentric coil sections of ribbon conductor wound on edge, a plate on either side of the coil, one of said plates having a plurality of integral projections extending between adjacent coil sections and engaging the other plate to hold the coil firmly between them.

11. In a meter-motor, an armature, and a field coil composed of concentric coil sections of ribbon conductor wound on edge and insulated from each other, and a plate on either side of the coil insulated therefrom, one of said plates having a plurality of integral projections extending between adjacent coil sections but insulated therefrom and engaging the other plate to hold the coil firmly between them.

12. In a meter-motor, an armature, a field coil composed of concentric coil sections, and a sheet-metal plate on either side of the coil, one of said plates being provided with a plurality of integral radial fingers and some of said fingers extending at an angle to the plate between adjacent coil sections and engaging the other plate to hold the coil firmly.

13. In a meter-motor, an armature consisting of a shaft, supports of non-magnetic material thereon, insulation on said supports and shaft, and coils of conductors wound over said supports to form a hollow sphere.

14. In a meter-motor, a shaft, supports of non-magnetic material thereon, insulation on said supports and shaft, and conductors wound over said supports to form an armature, said conductors extending a greater distance from the shaft than said supports.

15. A meter having a pivoted shaft, an armature and commutator carried thereby, said armature having its coils connected to the segments of the commutator, field coils mounted in coöperative relation to the armature, a register driven by the shaft, means for retarding the rotation of the shaft, a pivoted brush-holder, a brush carried thereby bearing on the commutator, and an adjustable weight for varying the contact pressure between said brush and commutator.

16. A meter having a pivoted shaft, an armature and commutator carried thereby, said armature having its coils connected to the segments of the commutator, field coils mounted in coöperative relation to the armature, a register driven by the shaft, means for retarding the rotation of the shaft, a pivotally-mounted brush-holder, brushes carried thereby bearing on the commutator, an arm rigidly attached to each brush holder, and a weight adjustable along each arm.

17. A meter having a frame, a pivoted shaft, an armature and commutator carried thereby, said armature having its coils connected to the segments of the commutator, field coils mounted in coöperative relation to the armature, a register driven by the shaft, means for retarding the rotation of the shaft, brush-holders pivotally mounted on the frame, brushes carried thereby bearing on the commutator, a threaded rod rigidly attached to each brush-holder, and a weight adjustable along each of said threaded rods and arranged to be locked in any adjusted position.

18. A meter having a frame, a pivoted shaft, an armature and commutator carried thereby, said armature having its coils connected to the segments of the commutator, field coils mounted in coöperative relation to the armature, a register driven by the shaft, means for retarding the rotation of the shaft, a block of insulating material secured on the frame, brush-holders pivotally mounted on said block, brushes carried thereby bearing on the commutator, a rod secured to each brush-holder and a weight adjustable along each rod and arranged to be locked in any adjusted position.

19. A meter having a pivoted shaft, an armature carried thereby, field coils mounted in coöperative relation to the armature, a register driven by the shaft, means for retarding the rotation of the shaft, a wrapping of silk thread covering a portion of the shaft, and a plurality of insulated commutator segments secured to the shaft about said covered portion and connected to the coils of the armature.

20. A meter having a pivoted shaft, an armature carried thereby, field coils mounted in coöperative relation to the armature, a register driven by the shaft, means for retarding the rotation of the shaft, a wrapping of fibrous material covering a portion of the shaft, a coating of an insulating compound on said material, and a plurality of commutator segments coated with an insulating compound secured to the shaft about said pivoted portion and connected to the coils of the armature.

21. A meter having a pivoted shaft, an armature carried thereby, field coils mounted in coöperative relation to the armature, a register driven by the shaft, means for retarding the rotation of the shaft, and a plurality of commutator segments individually insulated, bound on the shaft by a wrapping of fibrous insulating material about the ends of the segments and connected to the coils of the armature.

22. A meter having a pivoted shaft, an armature carried thereby, field coils mounted in coöperative relation to the armature, a register driven by the shaft, means for retarding the rotation of the shaft, and a plurality of individually insulated commutator segments bound on the shaft by a wrapping of silk thread about the ends of the segments and connected to the coils of the armature.

23. A meter having a pivoted shaft, an armature carried thereby, field coils mounted in coöperative relation to the armature, a register driven by the shaft, means for retarding the rotation of the shaft, fibrous material wound on the shaft and covering a portion thereof, a coating of an insulating compound thereon, a plurality of commutator segments insulated and connected to the coils of the armature, and a wrapping of silk thread about the ends of the commutator segments binding them to the shaft about said insulated portion.

24. In a measuring instrument, a frame, a shaft, a guard thereon, a stationary member mounted on the frame and coöperating with said guard, a normally-strained helical spring with its axis substantially in line with the axis of the shaft adapted to move the shaft when released to bring the guard into engagement with said member, and means for releasing the spring.

25. In a measuring instrument, a frame, a vertical shaft, a guard thereon, an adjustable member supported on the frame coöperating with said guard and so mounted as to insure alinement therewith, a normally strained spring adapted to move the shaft when released, a threaded lower bearing post mounted on the frame of the meter, and means whereby unscrewing said bearing post releases the spring which raises the shaft of the meter to bring said guard into engagement with said member.

26. In an electric measuring instrument, a rotatable shaft, and a device for retarding its rotation, comprising a metallic disk mounted on the shaft, a pair of permanent magnets whose lines of force are cut by said disk, a clamp for holding the magnets in a definite relation, said magnets having their poles oppositely arranged, means permitting adjustment of said clamp toward and away from the meter shaft, and locking means for securing the clamp in any adjusted position.

27. In a meter, the combination with its shaft, a damping disk thereon and a damping magnet between whose poles the disk may rotate, of a removable bearing post for the shaft, and means operated when the post is removed for supporting the shaft with the damping disk out of engagement with the poles of the damping-magnet.

In witness whereof I have hereunto set my hand this second day of May, 1904.

WILLIAM H. PRATT.

Witnesses:
 ROBERT SHAND,
 DUGALD McK. McKILLOP.